United States Patent
Kallenbach et al.

(10) Patent No.: US 6,956,064 B2
(45) Date of Patent: Oct. 18, 2005

(54) CATALYST COMPOSITION COMPRISING RUTHENIUM AND ZIRCONIUM AND PROCESSES THEREFOR AND THEREWITH FOR PREPARING HIGH MOLECULAR WEIGHT HYDROCARBONS SUCH AS POLYMETHYLENE

(75) Inventors: Lyle R. Kallenbach, Bartlesville, OK (US); Jianhua Yao, Bartlesville, OK (US); James B. Kimble, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 199 days.

(21) Appl. No.: 10/334,771

(22) Filed: Dec. 31, 2002

(65) Prior Publication Data

US 2004/0127583 A1 Jul. 1, 2004

(51) Int. Cl.$^7$ ............................................. C07C 27/00
(52) U.S. Cl. .................... 518/715; 709/718; 709/720
(58) Field of Search .............................. 518/715, 709, 518/718, 720, 700

(56) References Cited

U.S. PATENT DOCUMENTS

| | | | |
|---|---|---|---|
| 4,405,499 A | 9/1983 | Tsang et al. | |
| 4,436,838 A | 3/1984 | Lin | |
| 4,477,595 A | 10/1984 | Madon | |
| 4,493,905 A | 1/1985 | Beuther et al. | |
| 4,497,908 A | 2/1985 | Lewis et al. | |
| 4,622,308 A | 11/1986 | Koikeda et al. | |
| 4,670,472 A | 6/1987 | Dyer et al. | |
| 4,681,867 A | 7/1987 | Dyer et al. | |
| 4,904,700 A | 2/1990 | Sapienza et al. | |
| 4,925,824 A | 5/1990 | Sapienza et al. | |
| 5,227,407 A | 7/1993 | Kim | |
| 5,372,849 A | 12/1994 | McCormick et al. | |
| 6,048,993 A | 4/2000 | Grubbs et al. | |

OTHER PUBLICATIONS

Cheikhi et al., Conversion of methane to higher alkanes by ruthenium loaded zirconium compound, Applied Catalysis, A General (1994), 118 (2), 187–198.*

* cited by examiner

*Primary Examiner*—J. Parsa
(74) *Attorney, Agent, or Firm*—Jeffrey R. Anderson

(57) ABSTRACT

A catalyst composition and a process of using a catalyst composition for preparing high molecular weight hydrocarbons, such as polymethylene, from a fluid containing hydrogen and carbon monoxide are disclosed. The catalyst composition contains ruthenium and zirconium. The zirconium can be present as a zirconium component that can be selected from zirconyl phosphate, zirconium oxide, and zirconium phosphate prepared by processes of the present invention.

68 Claims, No Drawings

CATALYST COMPOSITION COMPRISING RUTHENIUM AND ZIRCONIUM AND PROCESSES THEREFOR AND THEREWITH FOR PREPARING HIGH MOLECULAR WEIGHT HYDROCARBONS SUCH AS POLYMETHYLENE

CROSS-REFERENCES TO RELATED APPLICATIONS

This patent application is related to U.S. patent application Ser. No. 10/334,773, entitled "Chemical Vapor Deposition Synthesis of Polymerization Catalyst Composition" to L. Kallenbach, filed concurrent herewith and incorporated herein by reference.

BACKGROUND OF THE INVENTION

The present invention relates to a process of preparing high molecular weight hydrocarbons, particularly polymethylene, in the presence of a catalyst composition.

It is known that reacting synthesis gas, a mixture of carbon monoxide and hydrogen, at very high pressures, for example greater than 15,000 pounds per square inch gauge (psig), and at temperatures of from about 100° C. to about 500° C. in the presence of supported catalysts can provide high molecular weight hydrocarbons such as polymethylene. However, the pressures required to produce such products from synthesis gas are difficult to achieve, require specific equipment, involve many safety issues, and have a negative impact on the economics of the process. Thus, production of high molecular weight hydrocarbons, such as polymethylene, utilizing moderate reaction conditions that do not require high pressures and related equipment needed to handle the high pressures would be a significant contribution to the art and to the economy.

It is also known that a serious problem associated with synthesis gas operations has been the non-selectivity of the product distribution since high activity catalysts generally yield a liquid product containing numerous hydrocarbon materials such as methanol and branched chain higher alcohols. Complicated recovery schemes are necessary to separate the desired products and the overall yield of the valuable organic products is low. Thus, a process that can produce high molecular weight hydrocarbons, such as polymethylene, from synthesis gas to provide a high degree of selectivity to polymethylene would also be of significant contribution to the art and to the economy.

It is also known that supported ruthenium catalyst compositions have been used at high pressure reaction conditions for producing polymethylene from synthesis gas. However, such catalyst compositions require the use of high pressures and are not useful for obtaining a high yield of polymethylene from synthesis gas conversion at moderate reaction conditions. Thus, a supported ruthenium catalyst composition, a process of making such catalyst composition, and a process for using such catalyst composition for producing polymethylene from synthesis gas that provides a high yield of polymethylene at moderate reaction conditions compared to supported ruthenium catalyst compositions utilized at high pressure conditions would also be of significant contribution to the art and to the economy.

SUMMARY OF THE INVENTION

It is an object of the present invention to provide a process for contacting, under reaction conditions, a catalyst composition, comprising ruthenium and zirconium, and a fluid comprising hydrogen and carbon monoxide to provide high molecular weight hydrocarbons, such as polymethylene, where moderate reaction conditions can be utilized. Such pressures can be in the range of pressures found in typical commercial operations.

Another object of the present invention is to provide a process that comprises contacting a catalyst composition, comprising ruthenium and zirconium, and a fluid comprising hydrogen and carbon monoxide wherein such process provides a yield of reaction products such as polymethylene that is higher compared to catalyst compositions that do not comprise zirconium.

Another object of the present invention is to provide novel catalyst compositions and processes of producing such catalyst compositions that can be utilized in the production of high molecular weight hydrocarbons, such as polymethylene, from the conversion of fluids comprising hydrogen and carbon monoxide.

An embodiment of the present invention comprises a process comprising contacting, under reaction conditions, a catalyst composition and a fluid comprising hydrogen and carbon monoxide. The catalyst composition comprises ruthenium and zirconium. Such a process utilizes moderate reaction conditions.

Another embodiment of the present invention comprises a catalyst composition comprising ruthenium and zirconium. Such catalyst composition can be prepared by a process comprising contacting a ruthenium component and a zirconium component that provides for a catalyst composition that can be contacted with a fluid comprising hydrogen and carbon monoxide to provide for high molecular weight hydrocarbons such as polymethylene.

Other objects and advantages of the present invention will become apparent from the detailed description and the appended claims.

DETAILED DESCRIPTION OF THE INVENTION

It has been discovered that a novel catalyst composition comprising ruthenium and zirconium can be contacted with a fluid comprising hydrogen and carbon monoxide to provide for high molecular weight hydrocarbons such as polymethylene that can be utilized under moderate reaction conditions. Further, such catalyst composition provides for higher yields of such high molecular weight hydrocarbons compared to currently used catalyst compositions such as ruthenium on silicon dioxide.

The term "high molecular weight hydrocarbon" as referred to herein includes any hydrocarbon having a molecular weight greater than about $2 \times 10^3$ molecular weight units (mwu) that can be prepared by a process of the present invention comprising contacting a fluid comprising hydrogen and carbon monoxide with a catalyst composition of the present invention comprising ruthenium and zirconium. The term "polymethylene" as referred to herein includes any hydrocarbon materials comprised substantially of methylene ($CH_2$) fragments catenated or linked in long chains. The long chains may contain branches. The polymethylene material comprises a mixture of various molecular weights.

A catalyst composition of the present invention comprises ruthenium and zirconium. In preparing a catalyst composition of the present invention, the ruthenium is initially present as a ruthenium component. A ruthenium component of the present invention can be any ruthenium component that suitably provides for a catalyst composition of the present invention comprising ruthenium that can be utilized in a process for preparing polymethylene according to a process of the present invention. Examples of a suitable ruthenium component include, but are not limited to, ruthenium bromide, ruthenium bromide hydrate, ruthenium chloride, ruthenium chloride hydrate, ruthenium iodide, ruthenium nitrosyl nitrate, ruthenium oxide, ruthenium oxide hydrate, ruthenium tetraoxide, and the like and combinations thereof. Examples of a preferred ruthenium component that can be utilized in preparing a catalyst composition of the present invention include, but are not limited to, ruthenium chloride, ruthenium nitrosyl nitrate, or ruthenium oxide. It should be understood that the ruthenium component may be converted to ruthenium during a process of preparing a catalyst composition of the present invention.

A zirconium component utilized in preparing a catalyst composition of the present invention can be any zirconium component that suitably provides for a catalyst composition of the present invention comprising zirconium that can be utilized in a process of preparing polymethylene according to a process of the present invention. Examples of a suitable zirconium component include, but are not limited to, zirconium oxide, zirconium phosphate, zirconyl phosphate, and the like and combinations thereof. It should be understood that the zirconium component may be converted to zirconium during a process of preparing a catalyst composition of the present invention.

An amount of ruthenium component utilized in a process of preparing a catalyst composition of the present invention is such as to provide a concentration of ruthenium in a catalyst composition of the present invention that suitably provides for a catalyst composition of the present invention that can be utilized in preparing polymethylene from a fluid comprising hydrogen and carbon monoxide. An amount of ruthenium component is such as to provide a concentration of ruthenium in a catalyst composition of the present invention generally in the range of from about 1 weight percent to about 30 weight percent based on the total weight of the catalyst composition, preferably in the range of from about 5 weight percent to about 25 weight percent, and more preferably in the range of from about 10 weight percent to about 20 weight percent.

An amount of zirconium component utilized in a process of preparing a catalyst composition of the present invention is such as to provide a concentration of zirconium in a catalyst composition of the present invention that suitably provides for a catalyst composition of the present invention that can be utilized in preparing polymethylene from a fluid comprising hydrogen and carbon monoxide. An amount of zirconium component is such as to provide a concentration of zirconium in a catalyst composition of the present invention generally in the range of from about 10 weight percent to about 90 weight percent based on the total weight of the catalyst composition, preferably in the range of from about 15 weight percent to about 80 weight percent, and more preferably in the range of from about 20 weight percent to about 70 weight percent.

A zirconium component utilized in a process of preparing a catalyst composition of the present invention can be prepared by any suitable manner or method(s) that suitably provides for a zirconium component of the present invention. Generally, when a zirconium component of the present invention comprises zirconyl phosphate, a process of preparing such zirconyl phosphate comprises contacting a zirconyl salt and a water-soluble acidic phosphorous compound, preferably phosphoric acid. Generally, the weight ratio of a zirconyl salt to a water-soluble acidic phosphorous compound, preferably phosphoric acid, is in the range of from about 0.5:1 to about 10:1, preferably in the range of from about 0.5:1 to about 5:1, and more preferably in the range of from about 1:1 to about 5:1.

A water-soluble acidic phosphorous compound utilized in preparing a catalyst composition of the present invention can be any water-soluble acidic phosphorous compound that suitably provides for a zirconium component, such as zirconyl phosphate or zirconium phosphate, as described herein that can be utilized in preparing a catalyst composition of the present invention comprising zirconium. Examples of a suitable water-soluble acidic phosphorous compound include, but are not limited to, phosphoric acid, phosphorous acid, and the like and combinations thereof. Preferably a water-soluble acidic phosphorous compound is phosphoric acid.

A zirconyl salt suitable for preparing zirconyl phosphate that can be utilized as a zirconium component in a catalyst composition of the present invention can be any zirconyl salt that suitably provides for a catalyst composition of the present invention. Examples of a suitable zirconyl salt include, but are not limited to, zirconyl chloride hydrate, zirconyl chloride octahydrate, zirconyl nitrate hydrate, zirconyl nitrate, zirconyl perchlorate octahydrate, and the like and combinations thereof. Preferably, a zirconyl salt utilized in preparing a zirconyl phosphate that can be utilized as a zirconium component in the preparation of a catalyst composition of the present invention is zirconyl nitrate hydrate.

A process of preparing a zirconyl phosphate of the present invention further comprises contacting a zirconyl salt and a water-soluble acidic phosphorous compound, preferably phosphoric acid, with a hydroxide component that provides for an increase of pH and for precipitating the zirconyl phosphate.

A hydroxide component utilized in preparing a catalyst composition of the present invention can be any hydroxide component that suitably provides for a zirconyl phosphate that can be utilized as a zirconium component in preparing a catalyst composition of the present invention. Examples of a suitable hydroxide component include, but are not limited to, ammonium hydroxide, tetramethyl ammonium hydroxide, tetramethyl ammonium bromide, tetraethyl ammonium bromide, lithium hydroxide, sodium hydroxide, sodium hydrosulfide, potassium hydroxide, calcium hydroxide, magnesium hydroxide, sodium bicarbonate, sodium carbonate, sodium oxide, sodium sulfate, magnesium oxide, calcium oxide, calcium carbonate, sodium phenoxide, barium phenoxide, calcium phenoxide, and the like and combinations thereof. A preferred example of a hydroxide component is ammonium hydroxide.

A weight ratio of hydroxide component to a zirconyl salt and a water-soluble acidic phosphorous compound, preferably phosphoric acid, can be any weight ratio that suitably provides for a zirconyl phosphate that can be utilized as a zirconium component in a catalyst composition of the present invention. Generally the weight ratio of hydroxide component to zirconyl salt and a water-soluble acidic phosphorous compound, preferably phosphoric acid, is in the range of from about 0.01:1 to about 1:1, preferably in the range of from about 0.1:1 to about 1:1, and more preferably in the range of from about 0.2:1 to about 0.5:1.

A process of preparing a zirconyl phosphate that can be utilized as a zirconium component in a catalyst composition of the present invention can further comprise contacting, such as washing, the zirconyl phosphate with an aqueous solution and can further comprise contacting, such as washing, with an alcohol. Examples of a suitable aqueous solution include, but are not limited to, deionized water. Examples of a suitable alcohol include, but are not limited to, methyl alcohol, ethyl alcohol, isopropyl alcohol, butyl alcohol, and the like and combinations thereof. A preferred alcohol is methyl alcohol.

A process of preparing a zirconyl phosphate of a catalyst composition of the present invention further comprises drying under a drying condition. A "drying condition" as referred to herein includes a temperature generally in the range of from about 20° C. to about 200° C., preferably in the range of from about 50° C. to about 175° C., and more preferably in the range of from about 50° C. to about 150° C. A drying condition further comprises a pressure generally in the range of from about 0 pounds per square inch absolute (psia) to about 200 psia, preferably in the range of from about 1 psia to about 150 psia, and more preferably in the range of from about 2 psia to about 100 psia. A drying condition further comprises a time period generally in the range of from about 0.5 hour to about 10 hours, preferably in the range of from about 0.5 hour to about 5 hours, and more preferably in the range of from about 1 hour to about 2 hours. A drying condition further comprises an atmosphere, suitable for drying as described herein, preferably air.

A process of preparing a zirconyl phosphate that can be utilized as a zirconium component of a catalyst composition of the present invention further comprises calcining under a calcining condition. A "calcining condition" as referred to herein includes a temperature generally in the range of from about 250° C. to about 1000° C., preferably in the range of from about 300° C. to about 800° C., and more preferably in the range of from about 400° C. to about 600° C. A calcining condition further comprises a pressure generally in the range of from about 0 pounds per square inch absolute (psia) to about 750 psia, preferably in the range of from about 1 psia to about 600 psia, and more preferably in the range of from about 2 psia to about 500 psia. A calcining condition further comprises a time period generally in the range of from about 0.5 hour to about 30 hours, preferably in the range of from about 1 hour to about 20 hours, and more preferably in the range of from about 1 hour to about 10 hours. The calcining can be done in an oxygen-containing atmosphere (e.g., air). During calcining, substantially all volatile matter (e.g., water and carbonaceous materials) is removed.

A process of preparing a zirconyl phosphate that can be utilized as a zirconium component of a catalyst composition of the present invention further comprises contacting the zirconyl phosphate with a silica component. A silica component can be any silica component that suitably provides for a catalyst composition of the present invention. Examples of a suitable silica component include, but are not limited to, silica, colloidal silica, silica gel, and the like and combinations thereof. Preferably a silica component is silica gel. Preferably, contacting of the zirconyl phosphate with a silica component occurs during contacting of a zirconyl salt and a water-soluble acidic phosphorous compound, preferably phosphoric acid, as described herein. A weight ratio of silica component to zirconyl phosphate can be any weight ratio that suitably provides for a catalyst composition of the present invention. Generally, a weight ratio of silica component to zirconyl phosphate is generally in the range of from about 0.01:1 to about 1:1, preferably in the range of from about 0.1:1 to about 0.75:1, and more preferably in the range of from about 0.1:1 to about 0.5:1.

When preparing a zirconyl phosphate or zirconium phosphate as described herein, contacting of a zirconyl salt and any water-soluble acidic phosphorous compound, preferably phosphoric acid, can include any contacting technique that suitably provides for a zirconium component of a catalyst composition of the present invention. Preferably, such contacting comprises contacting under a precipitating condition that comprises a temperature, pressure, and time period that suitably provides for the precipitation of a zirconium-containing precipitate. A "precipitating condition" as referred to herein includes a temperature generally in the range of from about 20° C. to about 90° C., preferably in the range of from about 20° C. to about 80° C., and more preferably in the range of from about 30° C. to about 70° C. A precipitating condition further includes a pressure generally in the range of from about 0 pounds per square inch absolute (psia) to about 100 psia, preferably in the range of from about 1 psia to about 80 psia, and more preferably in the range of from about 2 psia to about 50 psia. A precipitating condition further includes a time period generally in the range of from about 0.1 hour to about 10 hours, preferably in the range of from about 0.1 hour to about 5 hours, and more preferably in the range of from about 0.1 hour to about 2 hours.

For example, when preparing a zirconium-containing precipitate as described herein, a first aqueous solution containing a water-soluble zirconyl salt such as zirconyl nitrate and a water-soluble acidic phosphorous compound, preferably phosphoric acid, is prepared. Any suitable concentrations of these compounds in the aqueous solution can be employed so long as the concentration can result in production of a zirconium-containing precipitate. Generally, a concentration of the compounds in aqueous solution is in the range of from about 0.02 mole/L to about 1 mole/L of each compound. The initial pH of the aqueous solution is generally in the range of from about 1 to about 3. When preparing a zirconyl phosphate that can be utilized as a zirconium component of a catalyst composition of the present invention, an aqueous hydroxide-component containing solution, preferably an aqueous solution of ammonium hydroxide containing in the range of from about 25 weight percent ammonium hydroxide to about 30 weight percent ammonium hydroxide, generally having a pH in the range of from about 10 to about 14, is then added, under a precipitating condition as described herein, to the first aqueous solution containing a water-soluble zirconyl salt and a water-soluble acidic phosphorous compound in an amount sufficient to raise the pH of the first solution to at least 7, preferably in the range of from about 8 to about 9, and to provide for the precipitation of zirconyl phosphate.

The dispersion of the formed zirconium-containing precipitate, preferably zirconyl phosphate or zirconium phosphate (when prepared in a manner similar to zirconyl phosphate, but without the use of a hydroxide component), in the aqueous solution is then subjected to any suitable solid-liquid separation method(s) known to one skilled in the art such as, for example, filtration, to substantially separate the precipitate from the aqueous solution to give a separated composition, preferably a separated precipitate comprising zirconyl phosphate or zirconium phosphate. Preferably, the separated precipitate is contacted, such as washed, with water to remove adhered solution therefrom, optionally followed by contacting, such as washing, with a water-soluble organic solvent such as an alcohol as described herein. The separated precipitate, preferably washed separated precipitate, is generally dried under a drying condition as described herein to provide a dried composition, preferably a dried precipitate, and generally calcined under a calcining condition.

A zirconium phosphate of the present invention can be prepared in a manner similar to a process of preparing a zirconyl phosphate as described herein but without the use of a hydroxide component. Generally, the process of preparing a zirconium phosphate comprises contacting a zirconyl salt as described herein with any water-soluble acidic phosphorous compound as described herein, preferably phosphoric acid, under a precipitating condition as described herein. Generally, when preparing zirconium phosphate, a weight ratio of zirconyl salt to water-soluble acidic phosphorous compound is generally in the range of from about 0.5:1 to about 10:1, preferably in the range of from about 1:1 to about 5:1, and more preferably in the range of from about 1:1 to about 3:1.

A zirconyl salt suitable for preparing a zirconium phosphate of the present invention can be any zirconyl salt as described herein. Preferably, a zirconyl salt suitable for preparing a zirconium phosphate of the present invention comprises zirconyl nitrate hydrate.

A preferred method of preparing a zirconium phosphate of the present invention that can be utilized as a zirconium component in preparing a catalyst composition of the present invention comprises contacting, under a precipitating condition as described herein, a zirconyl salt, preferably zirconyl nitrate hydrate, dissolved in water with a water-soluble acidic phosphorous compound, preferably phosphoric acid, while stirring followed by filtering, washing with an aqueous solution, and contacting with an alcohol as described herein. The resulting zirconium phosphate precipitate is than subjected to a pressure drying under a pressure drying condition that includes a temperature, pressure, time period, and atmosphere that suitably provides for pressure drying of a zirconium phosphate precipitate as described herein. A "pressure drying condition" as referred to herein includes a temperature generally in the range of from about 200° C. to about 500° C., preferably in the range of from about 200° C. to about 400° C., and more preferably in the range of from about 200° C. to about 300° C. A pressure drying condition further comprises a pressure generally in the range of from about 14.7 pounds per square inch absolute (psia) to about 400 psia, preferably in the range of from about 50 psia to about 300 psia, and more preferably in the range of from about 50 psia to about 200 psia. A pressure drying condition further comprises a time period generally in the range of from about 0.5 hour to about 10 hours, preferably in the range of from about 1 hour to about 10 hours, and more preferably in the range of from about 1 hour to about 5 hours. A pressure drying condition further comprises an atmosphere comprising nitrogen, argon, and the like and combinations thereof. A pressure drying condition as described herein can be conducted in any suitable vessel capable of providing the temperature, pressure, time period, and atmosphere as described herein. An example vessel for conducting a pressure drying condition as described herein is an autoclave. A pressure drying condition as described herein can also include the presence of a water-soluble organic solvent such as an alcohol as described herein, preferably methanol. After the pressure drying, the resulting pressure-dried precipitate can then be dried under a drying condition as described herein. In addition to, or in lieu of, drying under a drying condition, the pressure-dried precipitate can be calcined under a calcining condition as described herein.

When a zirconium component of a catalyst composition of the present invention comprises zirconium oxide, the zirconium oxide can be prepared by a process generally comprising contacting a zirconyl salt as described herein and an ammonia component under a precipitating condition as described herein. Examples of a suitable ammonia component include, but are not limited to, ammonia, ammonium acetate, ammonium bromide, ammonium carbonate, ammonium chloride, ammonium fluoride, ammonium iodide, ammonium nitrate, ammonium sulfate, and the like and combinations thereof.

When preparing a zirconium oxide that can be utilized as a zirconium component of a catalyst composition of the present invention, an aqueous ammonia-component containing solution, preferably an aqueous solution of ammonia containing in the range of from about 5 weight percent ammonia to about 20 weight percent ammonia, preferably about 15 weight percent ammonia, generally having a pH in the range of from about 10 to about 14, is added to a first aqueous solution containing a zirconyl salt, preferably zirconyl nitrate hydrate, under a precipitating condition as described herein in an amount sufficient to raise the pH of the first solution to at least 7, preferably in the range of from about 8 to about 9, to provide for the precipitation of zirconium oxide.

The dispersion of the formed zirconium oxide in the aqueous solution is then subjected to any suitable solid-liquid separation method(s) known to one skilled in the art such as, for example, filtration, to substantially separate the precipitate from the aqueous solution to give a separated composition, preferably a separated precipitate comprising zirconium oxide. Preferably, the separated precipitate is contacted, such as washed, with water to remove adhered solution therefrom, optionally followed by contacting, such as washing, with a water-soluble organic solvent such as an alcohol as described herein. The separated precipitate, preferably washed separated precipitate, is generally dried under a drying condition as described herein to provide a dried composition, preferably a dried precipitate. Preferably, in addition to drying under a drying condition, the separated precipitate comprising zirconium oxide, preferably washed and dried separated precipitate, is pressure dried under a pressure drying condition as described herein. More preferably, in lieu of drying under a drying condition, the separated precipitate comprising zirconium oxide, preferably washed separated precipitate, is pressure dried under a pressure drying condition as described herein. Pressure drying can be followed by drying under a drying condition as described herein followed by calcining under a calcining condition as described herein.

Generally, when preparing a zirconium oxide as described herein, a weight ratio of a zirconyl salt to an ammonia component, preferably a 15 weight percent ammonia solution, is generally in the range of from about 0.5:1 to about 10:1, preferably in the range of from about 1:1 to about 5:1, and more preferably in the range of from about 1:1 to about 3:1.

Contacting of a ruthenium component and a zirconium component as referred to herein comprises any contacting manner or method(s) that suitably provides for a catalyst composition of the present invention. Examples of suitable contacting include, but are not limited to, impregnation, vapor phase deposition, contacting under a pressure drying condition as described herein, and the like and combinations thereof. Generally, contacting a ruthenium component and a zirconium component according to a process of the present invention comprises any impregnation technique known in the art. A preferred impregnation technique is "incipient wetness impregnation" that includes essentially completely filling the pores of the zirconium component with a solution containing a ruthenium component of the present invention.

The ruthenium component of the present invention can be contacted with the zirconium component of the present invention in any suitable manner so long as a catalyst composition of the present invention can be prepared. Generally, the zirconium component is first impregnated with a ruthenium component dissolved in an aqueous solution such as deionized water, by incipient wetness impregnation. Dissolving or dispersing a ruthenium component in an aqueous solution can be conducted by any suitable means or method(s) such using an ultrasonic probe. The zirconium component can also be sprayed with an impregnating solution containing a dissolved ruthenium component. Generally, the concentration of the ruthenium component in the impregnating solution is in the range of from about 0.01 gm/mL to about 1 gm/mL, preferably in the range of from about 0.02 gm/mL to about 0.5 gm/mL. The presently preferred ruthenium component to be used in the impregnating solution is ruthenium chloride hydrate. Examples of a suitable solvent of the impregnating solution include, but are not limited to, deionized water, an alcohol as described herein, and the like and combinations thereof. The amounts of ruthenium component and zirconium component utilized are amounts suitable to provide concentrations as described herein of ruthenium and zirconium in a catalyst composition of the present invention.

Another example contacting of a ruthenium component of the present invention and a zirconium component of the present invention is to add a zirconium phosphate precipitate as described herein to a solution of ruthenium component, preferably ruthenium chloride hydrate and methyl alcohol, while stirring and then subject the resulting slurry mixture to pressure drying under a pressure drying condition as described herein, preferably by charging the resulting slurry mixture to an autoclave as described herein. After pressure drying, the resulting material can be dried under a drying condition as described herein and in addition to, or in lieu of, drying under a drying condition, treated under a treating condition as described herein.

After the contacting of a ruthenium component and a zirconium component as described herein, the resulting catalyst composition of the present invention is generally dried under a drying condition as described herein and in addition to, or in lieu of drying, subjected to treating under a treating condition. A "treating condition" as referred to herein includes a temperature generally in the range of from about 250° C. to about 1000° C., preferably in the range of from about 300° C. to about 800° C., and more preferably in the range of from about 400° C. to about 600° C. A treating condition further comprises a pressure generally in the range of from about 0 pounds per square inch absolute (psia) to about 750 psia, preferably in the range of from about 1 psia to about 600 psia, and more preferably in the range of from about 2 psia to about 500 psia. A treating condition further comprises a time period generally in the range of from about 0.5 hour to about 30 hours, preferably in the range of from about 1 hour to about 20 hours, and more preferably in the range of from about 1 hour to about 10 hours. A treating condition further comprises an atmosphere selected from the group consisting of an oxygen-containing atmosphere (e.g., air), nitrogen, argon, and the like and combinations thereof. When preparing zirconium oxide or zirconium phosphate as described herein, the atmosphere preferably comprises air. When preparing zirconyl phosphate as described herein, the atmosphere is preferably selected from the group consisting of nitrogen, argon, and the like and combinations thereof.

A process of preparing a catalyst composition of the present invention further comprises, after contacting a zirconium component and a ruthenium component according to a process of the present invention, activating under an activating condition that suitably provides for a catalyst composition that can be utilized in a process of the present invention for producing polymethylene from a fluid comprising hydrogen and carbon monoxide. Preferably, after contacting a zirconium component and a ruthenium component as described herein, the resulting composition is dried under a drying condition as described herein and treated under a treating condition as described herein before activating under an activating condition as described herein. An "activating condition" as referred to herein includes a temperature generally in the range of from about 50° C. to about 500° C., preferably in the range of from about 60° C. to about 400° C., and more preferably in the range of from about 70° C. to about 300° C. An activating condition further comprises a pressure generally in the range of from about 0 pounds per square inch absolute (psia) to about 750 psia, preferably in the range of from about 1 psia to about 500 psia, and more preferably in the range of from about 2 psia to about 400 psia. An activating condition as referred to herein further comprises a time period generally in the range of from about 0.1 hour to about 30 hours, preferably in the range of from about 0.5 hour to about 20 hours, and more preferably in the range of from about 1 hour to about 10 hours. An activating condition further comprises an atmosphere suitable for activating a catalyst composition of the present invention. Examples of a suitable activating atmosphere include, but are not limited to, hydrogen, carbon monoxide, synthesis gas, other reducing gases, and the like and combinations thereof. A preferred activating atmosphere is hydrogen.

A process of preparing a catalyst composition of the present invention can further comprise, after activating as described herein, contacting, preferably stripping, with a stripping component that provides for a removing or stripping of excess, unwanted components or contaminants such as chlorides from a catalyst composition of the present invention. Examples of a suitable stripping component that can be utilized for removing or stripping components from a catalyst composition of the present invention include, but are not limited to, ammonium hydroxide, tetramethyl ammonium hydroxide, tetraethyl ammonium hydroxide, tetrapropyl ammonium hydroxide, and the like and combinations thereof. Preferably a stripping component is ammonium hydroxide. Generally, a weight ratio of stripping component to catalyst composition is generally in the range of from about 0.001:1 to about 0.1:1 and preferably in the range of from about 0.001:1 to about 0.01:1. After stripping with a stripping component as described herein, a catalyst composition of the present invention is then subjected to a reactivating by subjecting the catalyst composition to an activating under an activating condition as described herein.

A weight ratio of zirconium to ruthenium of a catalyst composition of the present invention can be any weight ratio that suitably provides for a catalyst composition of the present invention that can be utilized in a process of the present invention to prepare polymethylene from a fluid comprising hydrogen and carbon monoxide. Generally, the weight ratio of zirconium to ruthenium of a catalyst composition of the present invention is generally in the range of from about 0.01:1 to about 5:1, preferably in the range of from about 0.05:1 to about 3:1, and more preferably in the range of from about 0.1:1 to about 2:1.

A catalyst composition of the present invention can have any suitable shape or form. Preferably, a catalyst composition of the present invention is in the form of tablets, pellets, extrudates, spheres, and the like and combinations thereof. A catalyst composition of the present invention generally has a particle size in the range of from about 50 micrometers to about 10 millimeters (mm), preferably in the range of from about 55 micrometers to about 8 mm, and more preferably in the range of from about 60 micrometers to about 6 mm.

A catalyst composition of the present invention can be used in a process of the present invention comprising contacting, under reaction conditions, a catalyst composition with a fluid comprising hydrogen and carbon monoxide. The term "fluid" as referred to herein denotes gas, liquid, vapor, and combinations thereof.

Generally, a mole ratio of hydrogen to carbon monoxide can be any mole ratio that provides for a fluid that can be contacted with a catalyst composition of the present invention to provide high molecular weight hydrocarbons, preferably polymethylene. Generally, the mole ratio of hydrogen to carbon monoxide is in the range of from about 1:1 to about 5:1, preferably in the range of from about 1:1 to about 4:1, more preferably in the range of from about 1:1 to about 3:1, and most preferably the mole ratio is about 2:1.

Reaction conditions of a process of the present invention can be any reaction conditions that suitably provide for the production of polymethylene from a fluid comprising hydrogen and carbon monoxide according to a process of the present invention. The reaction conditions generally comprise a temperature generally in the range of from about 100° C. to about 500° C., preferably in the range of from about 100° C. to about 400° C., and more preferably in the range of from about 100° C. to about 300° C. The reaction conditions further comprise a pressure generally in the range of from about 500 pounds per square inch gauge (psig) to about 10,000 psig, preferably in the range of from about 750 psig to about 7500 psig, and more preferably in the range of from about 1000 psig to about 5000 psig. The reaction conditions further comprise a charge rate of fluid such that the weight hourly space velocity is generally in the range of from about 0.01 hour$^{-1}$ to about 1000 hour$^{-1}$, preferably in the range of from about 0.05 hour$^{-1}$ to about 750 hour$^{-1}$, and more preferably in the range of from about 0.1 hour$^{-1}$ to about 500 hour$^{-1}$.

A process of the present invention can further comprise contacting the catalyst composition and fluid comprising hydrogen and carbon monoxide in the presence of a solvent. Examples of a suitable solvent include, but are not limited to, cyclopentane, cyclohexane, cycloheptane, cyclooctane, and the like and combinations thereof, preferably cyclohexane. Generally, a weight ratio of solvent to catalyst composition can be any weight ratio that provides for the preparation of polymethylene from a fluid comprising hydrogen and carbon monoxide. A weight ratio of solvent, preferably cyclohexane, to catalyst composition is generally in the range of from about 400:1 to about 20:1, preferably in the range of from about 300:1 to about 50:1, and more preferably in the range of from about 200:1 to about 80:1.

The fluid comprising hydrogen and carbon monoxide can be contacted by any suitable means, method(s), or manner with a catalyst composition of the present invention as described herein contained within a reaction zone. The contacting step can be operated as a batch process step or, preferably, as a continuous process step, preferably in a slurry phase reactor. In the latter operation, a solid catalyst bed, a moving catalyst bed, a fluidized catalyst bed, or a bubble slurry bed can be employed. Any of these operational modes have advantages and disadvantages, and those skilled in the art can select the one most suitable for a particular fluid and catalyst composition. The contacting step is preferably carried out within a reaction zone comprising a slurry phase reactor wherein is contained a catalyst composition of the present invention and under reaction conditions that suitably promote the production of high molecular weight hydrocarbons comprising polymethylene from at least a portion of the fluid.

Generally, the process effluent from the reaction zone, also referred to as a contacting zone, can be separated into the principal fractions such as high molecular weight hydrocarbons comprising polymethylene and lighter fractions such as alcohols and lower molecular weight hydrocarbons, by any known method(s) such as, for example, fractionation distillation. Because the separation methods are well-known to one skilled in the art, the description of such separation methods is omitted herein.

After a catalyst composition of the present invention has been deactivated by, for example, coke deposition or feed poisons, to the extent that the fluid conversion and/or the selectivity to polymethylene has become unsatisfactory, the catalyst composition can be reactivated by any means or method(s) known to one skilled in the art such as, for example, calcining in air to burn off deposited coke and other carbonaceous materials, such as oligomers or polymers, preferably at a temperature in the range of from about 400° C. to about 1000° C. The optimal time periods of calcining depend generally on the types and amounts of deactivating deposits on the catalyst composition and on the calcination temperatures. These optimal time periods can easily be determined by those possessing ordinary skill in the art and are omitted herein for the interest of brevity.

The following examples are presented to further illustrate the present invention and are not to be construed as unduly limiting the scope of the present invention.

EXAMPLE I

This example illustrates the preparation of several catalyst compositions that were subsequently tested as catalysts in the preparation of polymethylene.

Catalyst A:

A 5.82 gram quantity of ruthenium chloride hydrate (RuCl$_3$.2H$_2$O) (obtained from Aldrich Chemical Company, Milwaukee, Wis. with a product designation 46,377-9) was dissolved in about 50 mL of deionized water using an ultrasonic probe for dispersion and to form a black slurry. The slurry was then added incrementally to a 15 gram quantity of silica gel (obtained from Aldrich Chemical Company, Milwaukee, Wis. with a product designation of 28,862-4 with a less than 60 mesh, 250 micron size) using an incipient wetness impregnation technique, i.e., essentially completely filling the pores of the silica gel. Drying was conducted at atmospheric pressure (about 14.7 psia) and room temperature (about 25° C.) between additions and, after the final addition, drying was conducted in a vacuum oven at 120° C. for about 1 hour. A 3.04 gram quantity of the resulting dried composition was then placed on a frit contained within a calcining tube located in a furnace. Gas flowed to the calcining tube through a one-eighth inch stainless steel induction tube and up through the frit. Depending on the desired contactings, treatings, and strippings to be conducted, the gas type and flow could be varied and a stripping component could also be added using a metering pump. After contact with the material(s) on the frit, the various gas flows exited the furnace and into a 500 mL Drechsel gas washing bottle and then vented to atmosphere. The conduits to and from the furnace were one-eighth inch TEFLON tubing. The 3.04 gram quantity of the resulting dried composition was treated at about 250° C. in a nitrogen atmosphere for about 20 minutes. The gas flow was then changed to hydrogen and the process was continued at about 250° C. for about 4 hours and 20 minutes to reduce the ruthenium. Catalyst A contained about 13.8 weight percent ruthenium and about 14 weight percent chloride based on analysis.

Catalyst B:

A 5.17 gram quantity of ruthenium chloride hydrate ($RuCl_3.2H_2O$) (obtained from Aldrich Chemical Company, Milwaukee, Wis. with a product designation 28,862-4) was dissolved in 15 mL of deionized water using an ultrasonic probe for dispersion and to form a slurry. The slurry was then added incrementally to a 12.09 gram quantity of silica gel (obtained from Aldrich Chemical Company, 70–230 mesh) with stirring. After the final addition, the resulting composition was allowed to dry in a vacuum oven at about 50° C. for about 16 hours. The resulting dried composition was then sieved to pass a 60 mesh screen to provide a sieved composition denoted herein as "Sieved Composition". A 2.5 gram quantity of the Sieved Composition was then placed on a frit contained within a calcining tube located in a furnace as described herein for Catalyst A. The Sieved Composition was treated at about 250° C. in a nitrogen atmosphere for about 1 hour. The gas was switched to hydrogen and the process was continued for about 1 hour. The resulting composition product was then treated for about 1 hour with 10 mL of 0.066 M ammonium hydroxide ($NH_4OH$) while being maintained at about 250° C. Hydrogen flow was then reintroduced for about 1 hour. Hydrogen flow was then stopped and nitrogen was used to cool the resulting composition. Catalyst B contained about 18.1 weight percent ruthenium and about 0.78 weight percent chloride based on analysis.

Catalyst C:

A 1.96 gram quantity of non-ammonium hydroxide treated Catalyst B described herein was placed on a frit contained within a calcining tube located in a furnace as described herein for Catalyst A and treated at about 250° C. in a nitrogen atmosphere for about 5 minutes. The gas was then switched to hydrogen and the process was continued at about 250° C. for about 3 hours to reduce the ruthenium. Catalyst C contained about 14.9 weight percent ruthenium and about 13 weight percent chloride based on analysis.

Catalyst D:

Catalyst D was a catalyst composition prepared in the same manner as Catalyst B described herein. Catalyst D was a duplication of Catalyst B.

Catalyst E:

A 40 gram quantity of zirconyl nitrate hydrate ($Zr(O)(NO_3)_2.2H_2O$) (obtained from Aldrich Chemical Company, Milwaukee, Wis. with a product designation 38,067-9) was placed in a 500 mL beaker with 300 mL deionized water and heated on a stirring hot plate with a magnetic stirrer to dissolve the zirconyl nitrate hydrate. A 14.5 mL quantity of 85 weight percent phosphoric acid (obtained from Aldrich Chemical Company, Milwaukee, Wis. with a product designation 21,510-4) was added using a dropping funnel. A sol-gel precipitate formed below a pH of 2. With heating and stirring, ammonium hydroxide ($NH_4OH$) (obtained from Aldrich Chemical Company, Milwaukee, Wis. with a product designation 32,0145-5) was added until the pH was about 8.4. Stirring was continued for an additional 30 minutes followed by filtering. The resulting filtered precipitate was washed by stirring with a 300 mL quantity of deionized water, filtered again, washed again with isopropyl alcohol, then filtered and dried in a vacuum oven at about 120° C. for about 16 hours. The resulting dried precipitate was then ground to pass a 60 mesh screen. A 33.83 gram quantity of the resulting ground material was collected and calcined at about 550° C. for about 2 hours to yield a 25.05 gram quantity of zirconyl phosphate (($Zr(O))_3(PO_4)_2$). A 4.26 gram quantity of ruthenium chloride hydrate ($RuCl_3.2H_2O$) (obtained from Aldrich Chemical Company, Milwaukee, Wis. with a product designation 46,377-9) was dissolved in 15 mL of deionized water using an ultrasonic probe for dispersion and to form a slurry. The slurry was then added incrementally, with drying in a vacuum oven, to a 10.06 gram sample of the zirconyl phosphate. After the final addition, the resulting composition was allowed to dry in a vacuum oven at about 50° C. for about 16 hours. The resulting composition was then ground and sieved to pass a 60 mesh screen. A 2.22 gram quantity of the resulting ground material was then was then placed on a frit contained within a calcining tube located in a furnace as described herein for Catalyst A and treated in a nitrogen atmosphere at about 150° C. to about 250° C. for about 3 hours followed by flowing hydrogen at about 275° C. for about 3 hours to reduce the ruthenium. Catalyst E contained about 15 weight percent ruthenium.

Catalyst F:

A 40.32 gram quantity of zirconyl nitrate hydrate ($Zr(O)(NO_3)_2.2H_2O$) (obtained from Aldrich Chemical Company, Milwaukee, Wis. with a product designation 38,067-9) was placed in a 600 mL beaker with 300 mL deionized water and heated on a stirring hot plate with a magnetic stirrer to dissolve the zirconyl nitrate hydrate. A 20 gram quantity of silica gel (obtained from Aldrich Chemical Company, Milwaukee, Wis. with a product designation of 28,862-4 with a less than 60 mesh, 250 micron size) was added to the zirconyl nitrate hydrate solution. A 14.5 mL quantity of 85 weight percent phosphoric acid (obtained from Aldrich Chemical Company, Milwaukee, Wis. with a product designation 21,510-4) was added using a dropping funnel. Stirring was continued until all the phosphoric acid had been added. A sol-gel precipitate formed below a pH of 2. With heating and stirring, ammonium hydroxide ($NH_4OH$) (obtained from Aldrich Chemical Company, Milwaukee, Wis. with a product designation 32,0145-5) was added until the pH was about 8.4. Stirring was continued for an additional 30 minutes followed by filtering. The resulting filtered precipitate was washed by stirring with a 300 mL quantity of deionized water, filtered again, washed again with isopropyl alcohol, then filtered and dried in a vacuum oven at about 120° C. for about 16 hours. The resulting dried precipitate comprising zirconyl phosphate and silica was then ground to pass a 60 mesh screen. A 5.12 gram quantity of ruthenium chloride hydrate ($RuCl_3.2H_2O$) (obtained from Aldrich Chemical Company, Milwaukee, Wis. with a product designation 46,377-9) dissolved in about 25 mL of deionized water using an ultrasonic probe for dispersion was then added to 12.14 grams of the resulting dried zirconyl phosphate and silica support in small increments using an incipient wetness impregnation technique, i.e., essentially completely filling the pores of the support, followed by drying in a vacuum oven at about 120° C. for about 16 hours. The resulting dried composition was then ground to pass an 80 mesh screen. A 4.68 gram quantity sample of the ground material comprising ruthenium, zirconyl phosphate, and silica was then placed on a frit contained within a calcining tube located in a furnace as described herein for Catalyst A and treated in a nitrogen atmosphere at about 275° C. for about 30 minutes. Over the course of the next 15 minutes, the gas was gradually changed to essentially pure hydrogen and the process was continued at about 275° C. for an additional 3 hours to reduce the ruthenium followed by cooling. Catalyst F contained about 17.3 weight percent ruthenium, about 22.4 weight percent zirconium, about 5.1 weight percent phosphorous, about 12.7 weight percent silica, and about 0.29 weight percent chloride based on analysis.

Catalyst G:

A 5.0 gram quantity sample of the ground material comprising ruthenium, zirconyl phosphate, and silica prepared for Catalyst F that was not reduced was placed on a frit contained within a calcining tube located in a furnace as described herein for Catalyst A and treated at about 250° C. in a nitrogen atmosphere for about 1 hour. The gas was then switched to hydrogen and the process was continued for about 1 hour. The resulting material was then treated for about 1 hour with 10 mL of 0.060 M ammonium hydroxide ($NH_4OH$) while being maintained at about 250° C. Hydrogen flow was then reintroduced for about 1 hour. Hydrogen flow was then stopped and nitrogen was used to cool the resulting composition. Catalyst G contained about 15 weight percent ruthenium, about 21 weight percent zirconium, about 5.5 weight percent phosphorous, about 13 weight percent silica, and about 0.1 weight percent chloride based on analysis.

Catalyst H:

A 3.52 gram quantity of ruthenium (III) nitrosyl nitrate ($Ru(NO)(NO_3)_3$) (obtained from Alfa-Aesar, Wardhill, Mass. with a product designation 12175) was dissolved in about 25 mL of deionized water using an ultrasonic probe for dispersion. A 5.76 gram quantity of the ground, dried precipitate support material comprising zirconyl phosphate and silica as described herein for Catalyst F was contacted with the ruthenium (III) nitrosyl nitrate dispersion in small increments using an incipient wetness impregnation technique, i.e., essentially completely filling the pores of the support, followed by drying in a vacuum oven at about 120° C. for about 16 hours. The resulting dried composition was then ground to pass an 80 mesh screen. A 2.55 gram quantity sample of the ground material was then placed on a frit contained within a calcining tube located in a furnace as described herein for Catalyst A and treated in a 1:1 mixture of nitrogen and hydrogen for about 10 minutes. The process was then continued at about 260° C. using essentially pure hydrogen for about 5 hours to reduce the ruthenium. Catalyst H contained about 15.5 weight percent ruthenium, about 21.5 weight percent zirconium, about 5.6 weight percent phosphorous, about 12.8 weight percent silica, and less than about 0.1 weight percent chloride based on analysis.

EXAMPLE II

This example illustrates the use of the catalyst compositions described herein in Example I as catalyst compositions in the preparation of high molecular weight hydrocarbons, such as polymethylene, from a fluid comprising hydrogen and carbon monoxide.

An approximately 2.0 gram sample of each of the catalyst compositions described in Example I was reduced at about 250° C. for about two hours with hydrogen. For each test, approximately 1.85 grams of each reduced sample were placed into a 300 cc stainless steel autoclave (Autoclave Engineers, Inc., Erie, Pa., Model BC00305505AH, pressure range: less than 6000 psig at 650° F.) with about 180 mL of cyclohexane. The reactor was closed and purged with nitrogen by pressurizing to 300 psig and then depressurizing to 0 psig over a time period of about 5 minutes. The nitrogen pressurizing and depressurizing was repeated four times. The reactor was then purged in a similar manner three times with a fluid containing hydrogen and carbon monoxide in a 2:1 mole ratio. The reactor was then purged in a similar manner three times with a fluid containing hydrogen and carbon monoxide in a 2:1 mole ratio while the mixer was turned on at 500 revolutions per minute for about 15 minutes following each purge. After purging, the reactor was pressurized to 1100 psig with a fluid containing hydrogen and carbon monoxide in a 2:1 mole ratio and heated to about 150° C. with the mixer at 500 revolutions per minute. The reactor pressure was maintained at about 1500 psig by adding the fluid containing hydrogen and carbon monoxide in a 2:1 mole ratio. Fluid uptake was monitored periodically during the run by stopping flow from the fluid feed tank and observing the change in pressure at the reactor. After several hours, the reaction was stopped. The cyclohexane and catalyst composition were separated from the polymer. The polymer was analyzed by gel permeation chromatography. Results of the tests for catalyst compositions A through H are summarized herein in Tables I and II. Table II discloses various characteristics of the product obtained utilizing the catalyst compositions. The productivity of the catalyst composition is reported as gm polymer/gm Ru/hr, which is grams of polymer produced per grams of ruthenium present per hour of reaction. Also noted were the synthesis gas ($H_2+CO$) uptakes (8 and 12 hour averages) (dPsi/min denotes differential in pressure/minute), the average molecular weight of the product (Mw), the average molecular number of the product (Mn), and the melting point range of the product.

TABLE I

| Catalyst | Catalyst/Support | Cat. Prep Method | Reactor temp (° C.) | Syn gas uptake dPsi/min (8 hr avg) | Syn gas uptake dPsi/min (12 hr avg) |
|---|---|---|---|---|---|
| A | Ru/SiO$_2$ | RuCl$_3$ | 156 | 3.4 | 3.4 |
| B | Ru/SiO$_2$ | RuCl$_3$ w/NH$_3$ strip | 148 | 5.4 | 4.3 |
| C | Ru/SiO$_2$ | RuCl$_3$ | 144 | 7.0 | 4.7 |
| D | Ru/SiO$_2$ | RuCl$_3$ w/NH$_3$ strip | 148 | 5.4 | 4.3 |
| E | Ru/(Zr(O))$_3$(PO$_4$)$_2$ | RuCl$_3$ | 158 | 9.2 | 8.7 |

TABLE I-continued

| Catalyst | Catalyst/Support | Cat. Prep Method | Reactor temp (° C.) | Syn gas uptake dPsi/min (8 hr avg) | Syn gas uptake dPsi/min (12 hr avg) |
|---|---|---|---|---|---|
| F | Ru/(Zr(O))$_3$(PO$_4$)$_2$/SiO$_2$ | RuCl$_3$ | 158 | 4.2 | 4.3 |
| G | Ru/(Zr(O))$_3$(PO$_4$)$_2$/SiO$_2$ | RuCl$_3$ w/NH$_3$ strip | 148 | 3.5 | 3.1 |
| H | Ru/(Zr(O))$_3$(PO$_4$)$_2$/SiO$_2$ | Ru(NO)(NO$_3$)$_3$ | 169 | 8.8 | 8.1 |

TABLE II

| Catalyst | Catalyst Productivity (gm polymer/ gm Ru/hr) | Melting Point (° C.) | Mw/1000 | Mn/1000 | Mw/Mn |
|---|---|---|---|---|---|
| A | 0.153 | 112–118 | 4.2 | 1.8 | 2.4 |
| B | 0.300 | 116–118 | — | — | — |
| C | 0.583 | 108–110 | 3.2 | 1.3 | 2.5 |
| D | 0.300 | 108–109 | 3.1 | 1.5 | 2.0 |
| E | 2.290 | 121–126 | 8.1 | 2.0 | 4.1 |
| F | 0.277 | 108–117 | 4.5 | 2.0 | 2.2 |
| G | 0.244 | 117–122 | 9.0 | 2.5 | 3.6 |
| H | 0.470 | 116–119 | 38.5 | 2.2 | 17.8 |

The test data presented in Tables I and II clearly show that catalyst compositions comprising ruthenium and zirconyl phosphate produce a higher molecular weight polymethylene than those without zirconyl phosphate. The test data presented in Tables I and II also show that catalyst compositions comprising ruthenium and zirconium can produce more polymethylene compared to a catalyst without zirconium. Further, the data clearly show that the specific sequence of preparing the catalyst composition affects the amount of polymethylene produced.

EXAMPLE III

This example illustrates the preparation of several catalyst compositions that were subsequently tested as catalysts in the preparation of polymethylene.

Catalyst I:

A 5.0 gram quantity of silica gel (obtained from Aldrich Chemical Company, Milwaukee, Wis. with a product designation 28,862-4) having a surface area (measured by the Brunauer Emmett Teller method, i.e., BET method) of 500 m$^2$/g and a pore volume of 0.75 cm$^2$/g was impregnated with a solution of 2.24 grams of ruthenium chloride hydrate (RuCl$_3$.xH$_2$O) dissolved in approximately 60 mL of deionized water followed by drying in a vacuum oven at 120° C. for about 16 hours followed by treating in air at a temperature of about 450° C. for about 4 hours.

Catalyst J:

A 9.0 gram quantity of zirconyl nitrate hydrate (obtained from Aldrich Chemical Company, Milwaukee, Wis. with a product designation 24,349-3) was dissolved in about 300 mL of deionized water to dissolve the zirconyl nitrate hydrate. Added to the zirconyl nitrate hydrate solution dropwise was about 60 mL of a 15 weight percent ammonia solution at room temperature (about 25° C.) while stirring using a syringe pump having a 60 cc syringe with a ¹⁄₁₀ range at a rate of about 15%. The procedure was repeated three more times and the resulting precipitate was collected and allowed to age at room temperature (about 25° C.) for about 48 hours. The resulting precipitate was then filtered, washed with deionized water, and redispersed with about 100 mL of ethyl alcohol and then filtered again. Approximately half of the resulting precipitate was pressure dried by placing the precipitate into an autoclave (Autoclave Engineers, Inc., Erie, Pa., Model BC00305505AH, pressure range: less than 6000 psig at 650° F.). A 70 mL quantity of ethyl alcohol was added followed by mixing using a feed of 130 pounds per square inch gauge (psig) nitrogen and heating to 220° C. for about one hour. The solvent was slowly released followed by cooling. The resulting powder was removed, dried in a vacuum oven at approximately 100° C. for about 16 hours to provide a quantity of resulting zirconium oxide. A 2.8 gram quantity of the resulting zirconium oxide was then calcined in air at about 500° C. for about 3 hours followed by grinding such calcined zirconium oxide to a powder (size about 40 mesh). The resulting zirconium oxide powder was then impregnated using an incipient wetness impregnation technique, i.e., essentially completely filling the pores of the zirconium component, with a solution of a 1.26 gram quantity of ruthenium chloride hydrate (obtained from Alfa-Aesar, Wardhill, Mass. with a product designation 11043; ruthenium=41.52 weight percent) dissolved in a 40 mL quantity of deionized water. Enough solution was added to wet the zirconium oxide powder followed by drying at 120° C. Then, more solution was added and repeated until all of the solution was utilized, followed by drying in a vacuum oven at 120° C. for about 16 hours. The resulting ruthenium and zirconium oxide composition was then treated in air at 450° C. for about 4 hours.

Catalyst K:

A 20 gram quantity of zirconyl nitrate hydrate (obtained from Aldrich Chemical Company, Milwaukee, Wis. with a product designation 24,349-3) was dissolved in about a 150 mL quantity of deionized water. Added to the zirconyl nitrate hydrate solution dropwise was a solution of a 12 gram quantity of 85 weight percent phosphoric acid and 16 mL deionized water while stirring at room temperature followed by stirring for about one hour followed by aging for about 16 hours at room temperature (about 25° C.). The resulting precipitate was then filtered, washed with deionized water, dried in a vacuum oven at 120° C. for about 16 hours, followed by calcining in air at about 450° C. for about four hours to provide a dried and calcined zirconium phosphate composition. A 5.0 gram quantity of the dried and calcined zirconium phosphate composition was then impregnated using an incipient wetness impregnation technique, i.e., essentially completely filling the pores of the zirconium component, with a 2.24 gram quantity of ruthenium chloride hydrate (obtained from Alfa-Aesar, Wardhill, Mass. with a product designation 11043; ruthenium=41.52 weight percent) dissolved in a 60 mL quantity of deionized water. The resulting ruthenium impregnated zirconium phosphate was then dried in a vacuum oven at 120° C. for about 16 hours followed by treating in air at about 450° C. for about four hours.

Catalyst L:

A 20 gram quantity of zirconyl nitrate hydrate (obtained from Aldrich Chemical Company, Milwaukee, Wis. with a product designation 24,349-3) was dissolved in about 150 mL deionized water. Added to the zirconyl nitrate hydrate solution dropwise was a solution of a 12 gram quantity of 85 weight percent phosphoric acid and 16 grams of deionized water while stirring at room temperature followed by stirring for about one hour at room temperature (about 25° C.). The resulting precipitate was filtered and washed with deionized water followed by redispersing with 150 mL of methyl alcohol followed by stirring for about 15 minutes. The resulting precipitate was filtered and washed with methyl alcohol and redispersed with 150 mL of methyl alcohol followed by stirring for about 5 minutes. The resulting slurry mixture was then pressure dried by charging the resulting slurry mixture to an autoclave (Autoclave Engineers, Inc., Erie, Pa., Model BC00305505AH, pressure range: less than 6000 psig at 650° F.) with a feed of 100 psig nitrogen and heated to 220° C. for about 1 hour. The solvent was slowly released followed by flushing with nitrogen. The resulting zirconium phosphate composition was then dried in a vacuum oven at 120° C. for about 16 hours to provide a resulting dried zirconium phosphate powder. A 5.0 gram quantity of the resulting dried zirconium phosphate powder was then impregnated using an incipient wetness impregnation technique, i.e., essentially completely filling the pores of the zirconium component, with a 2.24 gram quantity of ruthenium chloride hydrate (obtained from Alfa-Aesar, Wardhill, Mass. with a product designation 11043; ruthenium=41.52 weight percent) dissolved in a 60 mL quantity of deionized water. The resulting ruthenium impregnated zirconium phosphate was then dried in a vacuum oven at 120° C. for about 16 hours followed by treating in air at about 300° C. for about 4 hours.

Catalyst M:

Approximately half of the quantity of the resulting dried zirconium phosphate powder described herein for Catalyst L was calcined in air at about 450° C. for about three hours to provide a dried and calcined zirconium phosphate composition. A 5.0 gram quantity of the dried and calcined zirconium phosphate composition was then impregnated using an incipient wetness impregnation technique, i.e., essentially completely filling the pores of the zirconium component, with a 2.24 gram quantity of ruthenium chloride hydrate (obtained from Alfa-Aesar, Wardhill, Mass. with a product designation 11043; ruthenium=41.52 weight percent) dissolved in a 60 mL quantity of deionized water. The resulting ruthenium impregnated zirconium phosphate was then dried in a vacuum oven at 120° C. for about 16 hours followed by treating in air at 450° C. for about four hours.

Catalyst N:

A 6.6 gram quantity of zirconyl nitrate hydrate (obtained from Aldrich Chemical Company, Milwaukee, Wis. with a product designation 24,349-3) was dissolved in about 50 mL of deionized water. Added to the zirconyl nitrate hydrate solution dropwise was a solution of a 4 gram quantity of 80 weight percent phosphoric acid and 6 mL deionized water while stirring at room temperature (about 25° C.) followed by stirring for about one hour at room temperature. The resulting precipitate was filtered, washed with deionized water, followed by washing with methyl alcohol to provide a zirconium phosphate precipitate composition. The resulting zirconium phosphate precipitate composition was then added to a solution of a 2.24 gram quantity of ruthenium chloride hydrate (obtained from Alfa-Aesar, Wardhill, Mass. with a product designation 11043; ruthenium=41.52 weight percent) and 100 mL of methanol followed by stirring at room temperature (about 25° C.) for about five minutes. The resulting slurry mixture was then pressure dried by charging the resulting slurry mixture to an autoclave (Autoclave Engineers, Inc., Erie, Pa., Model BC00305505AH, pressure range: less than 6000 psig at 650° F.) with a feed of 100 psig of nitrogen and heating to 220° C. for about two hours. The solvent was slowly released followed by flushing with nitrogen. The resulting zirconium phosphate composition was then dried in a vacuum oven at about 110° C. for about two hours. The resulting dried composition was then treated in air at about 450° C. for about four hours.

EXAMPLE IV

This example illustrates the use of the catalyst compositions described in Example III as catalyst compositions in the preparation of high molecular weight hydrocarbons, such as polymethylene, from a fluid comprising hydrogen and carbon monoxide.

An approximately 2.0 gram sample of each of the catalyst compositions described in Example III was reduced at about 250° C. for about two hours with hydrogen. For each test, approximately 1.85 grams of each reduced sample were placed into a 300 cc stainless steel autoclave (Autoclave Engineers, Inc., Erie, Pa., Model BC00305505AH, pressure range: less than 6000 psig at 650° F.) with about 180 mL of cyclohexane. The reactor was closed and purged with nitrogen by pressurizing to 300 psig and then depressurizing to 0 psig over a time period of about 5 minutes. The nitrogen pressurizing and depressurizing was repeated five times. The reactor was then purged in a similar manner five times with a fluid containing hydrogen and carbon monoxide in a 2:1 mole ratio. After purging, the reactor was pressurized to 1500 psig with a fluid containing hydrogen and carbon monoxide in a 2:1 mole ratio along with cyclohexane as the solvent and heated to about 150° C. with the mixer at 500 revolutions per minute. The pressure of the reactor was maintained at 1500 psig by adding the fluid containing hydrogen and carbon monoxide. After several hours, the reaction was stopped and the cyclohexane, polymer, and catalyst composition were recovered and analyzed by gas chromatography and gel permeation chromatography. The approximate time of the reaction was in the range of about eight to about fourteen hours. Results of the tests for catalyst compositions I through N are summarized in Table III. The productivity of the catalyst composition is reported as gm polymer/gm Ru/hr, which is grams of polymer produced per grams of ruthenium present per hour of reaction.

TABLE III

| CATALYST | CATALYST DESCRIPTION | CATALYST PRODUCTIVITY (gm polymer/ gm Ru/hr) | PERCENTAGE INCREASE IN POLYMETHYLENE PRODUCTIVITY COMPARED TO CATALYST I (%) |
|---|---|---|---|
| I | 15% Ru/SiO$_2$ | 0.329 | — |
| J | 15% Ru/ZrO$_2$ | 0.57 | 73 |
| K | Zirconium phosphate (vacuum oven dried) + calcine + Ru | 0.472 | 43 |
| L | Zirconium phosphate (autoclave, methanol dried) + Ru | 0.645 | 96 |
| M | Zirconium phosphate (autoclave, methanol dried) + calcine + Ru | 0.966 | 193 |
| N | Zirconium phosphate (simultaneously drying in autoclave in presence of methanol while incorporating Ru) | 1.225 | 272 |

The test data presented in Table III clearly show that catalyst compositions comprising ruthenium and zirconium clearly produce more polymethylene compared to a catalyst without zirconium. Further, the data clearly show that the specific sequence of preparing the catalyst composition affects the amount of polymethylene produced.

The results shown in the above examples clearly demonstrate that the present invention is well adapted to carry out the objects and obtain the ends and advantages mentioned as well as those inherent therein.

Reasonable variations, modifications, and adaptations can be made within the scope of the disclosure and the appended claims without departing from the scope of the present invention.

What is claimed is:

1. A process of preparing a high molecular weight hydrocarbon comprising contacting, under reaction conditions, a catalyst composition and a fluid comprising hydrogen and carbon monoxide wherein said catalyst composition is prepared by a process comprising contacting a ruthenium component and a zirconium component wherein said contacting of said catalyst composition and said fluid is conducted in the presence of a solvent selected from the group consisting of cyclopentane, cyclohexane, cycloheptane, cyclooctane, and combinations thereof, and wherein said contacting said ruthenium component and said zirconium component comprises vapor phase deposition, contacting under a pressure drying condition, and combinations thereof.

2. A process according to claim 1 wherein said high molecular weight hydrocarbon comprises a molecular weight greater than about 2×10$^3$ molecular weight units.

3. A process according to claim 1 wherein said high molecular weight hydrocarbon comprises polymethylene.

4. A process according to claim 1 wherein a mole ratio of said hydrogen to said carbon monoxide is in the range of from about 1:1 to about 5:1.

5. A process according to claim 1 wherein said reaction conditions comprise:
a temperature in the range of from about 100° C. to about 500° C.,
a pressure in the range of from about 500 pounds per square inch gauge to about 10,000 pounds per square inch gauge, and
a charge rate of said fluid such that the weight hourly space velocity is in the range of from about 0.01 hours$^{-1}$ to about 1000 hour$^{-1}$.

6. A process according to claim 1 wherein a weight ratio of said solvent to catalyst composition is in the range of from about 400:1 to about 20:1.

7. A process according to claim 1 wherein said process of preparing a high molecular weight hydrocarbon is conducted in a slurry phase reactor.

8. A process according to claim 1 wherein said ruthenium component is selected from the group consisting of ruthenium bromide, ruthenium bromide hydrate, ruthenium chloride, ruthenium chloride hydrate, ruthenium iodide, ruthenium nitrosyl nitrate, ruthenium oxide, ruthenium oxide hydrate, ruthenium tetraoxide, and combinations thereof.

9. A process according to claim 1 wherein said ruthenium component comprises ruthenium chloride, ruthenium nitrosyl nitrate, or ruthenium oxide.

10. A process according to claim 1 wherein said zirconium component is selected from the group consisting of zirconium oxide, zirconium phosphate, zirconyl phosphate, and combinations thereof.

11. A process according to claim 1 wherein said pressure drying condition comprises:
a temperature in the range of from about 200° C. to about 500° C.,
a pressure in the range of from about 14.7 pounds per square inch absolute to about 400 pounds per square inch absolute,
a time period of from about 0.5 hour to about 10 hours, and
further wherein said pressure drying condition comprises an atmosphere selected from the group consisting of nitrogen, argon, and combinations thereof.

12. A process according to claim 1 wherein an amount of said ruthenium component is such as to provide a concentration of ruthenium in said catalyst composition in the range of from about 1 weight percent to about 30 weight percent based on the total weight of said catalyst composition.

13. A process according to claim 1 wherein an amount of said zirconium component is such as to provide a concentration of zirconium in said catalyst composition in the range of from about 10 weight percent to about 90 weight percent based on the total weight of said catalyst composition.

14. A process according to claim 1 further comprises, after contacting said zirconium component and said ruthenium component, treating under a treating condition comprising:
  a temperature in the range of from about 250° C. to about 1000° C.,
  a pressure in the range of from about 0 pounds per square inch absolute to about 750 pounds per square inch absolute,
  a time period in the range of from about 0.5 hour to about 30 hours, and
  further wherein said treating condition comprises an atmosphere selected from the group consisting of an oxygen-containing atmosphere, nitrogen, argon, and combinations thereof.

15. A process according to claim 1 wherein said process further comprises, after contacting said zirconium component and said ruthenium component, activating under an activating condition comprising:
  a temperature in the range of from about 50° C. to about 500° C.,
  a pressure in the range of from about 0 pounds per square inch absolute to about 750 pounds per square inch absolute,
  a time period in the range of from about 0.1 hour to about 30 hours, and
  further wherein said activating condition comprises an atmosphere selected from the group consisting of hydrogen, carbon monoxide, synthesis gas, other reducing gases, and combinations thereof.

16. A process according to claim 15 further comprises, after said activating, contacting with an ammonia component selected from the group consisting of ammonium hydroxide, tetramethyl ammonium hydroxide, tetraethyl ammonium hydroxide, tetrapropyl ammonium hydroxide, and combinations thereof followed by reactivating by subjecting to activating under said activating condition.

17. A process according to claim 14 further comprises, after said contacting said zirconium component and said ruthenium component and before said treating under a treating condition, drying under a drying condition comprising:
  a temperature in the range of from about 20° C. to about 200° C.,
  a pressure in the range of from about 0 pounds per square inch absolute to about 200 pounds per square inch absolute,
  a time period in the range of from about 0.5 hour to about 10 hours, and
  further wherein said drying condition comprises an atmosphere comprising air.

18. A process according to claim 1 wherein a weight ratio of zirconium to ruthenium of said catalyst composition is in the range of from about 0.01:1 to about 5:1.

19. A process according to claim 10 wherein said zirconyl phosphate is prepared by a process comprising contacting a zirconyl salt and a water-soluble acidic phosphorous compound.

20. A process according to claim 19 wherein said water-soluble acidic phosphorous compound is selected from the group consisting of phosphoric acid, phosphorous acid, and combinations thereof.

21. A process according to claim 19 wherein said water-soluble acidic phosphorous compound is phosphoric acid.

22. A process according to claim 19 wherein a weight ratio of said zirconyl salt to said water-soluble acidic phosphorous compound is in the range of from about 0.5:1 to about 10:1.

23. A process according to claim 19 wherein said process of preparing said zirconyl phosphate further comprises contacting said zirconyl salt and water-soluble acidic phosphorous compound with a hydroxide component under a precipitating condition to provide for an increase of pH and for precipitating said zirconyl phosphate.

24. A process according to claim 23 wherein said precipitating condition comprises:
  a temperature in the range of from about 20° C. to about 90° C.,
  a pressure in the range of from about 0 pounds per square inch absolute to about 100 pounds per square inch absolute, and
  a time period in the range of from about 0.1 hour to about 10 hours.

25. A process according to claim 19 wherein said zirconyl salt is selected from the group consisting of zirconyl chloride hydrate, zirconyl chloride octahydrate, zirconyl nitrate hydrate, zirconyl nitrate, zirconyl perchlorate octahydrate, and combinations thereof.

26. A process according to claim 19 wherein said zirconyl salt comprises zirconyl nitrate hydrate.

27. A process according to claim 23 wherein said hydroxide component is selected from the group consisting of ammonium hydroxide, tetramethyl ammonium hydroxide, tetramethyl ammonium bromide, tetraethyl ammonium bromide, lithium hydroxide, sodium hydroxide, sodium hydrosulfide, potassium hydroxide, calcium hydroxide, magnesium hydroxide, sodium bicarbonate, sodium carbonate, sodium oxide, sodium sulfate, magnesium oxide, calcium oxide, calcium carbonate, sodium phenoxide, barium phenoxide, calcium phenoxide, and combinations thereof.

28. A process according to claim 27 wherein said hydroxide component comprises ammonium hydroxide.

29. A process according to claim 23 wherein a weight ratio of said hydroxide component to said zirconyl salt and water-soluble acidic phosphorous compound is in the range of from about 0.01:1 to about 1:1.

30. A process according to claim 19 wherein said process of preparing said zirconyl phosphate further comprises contacting said zirconyl phosphate with an aqueous solution.

31. A process according to claim 19 wherein said process of preparing said zirconyl phosphate further comprises contacting with an alcohol selected from the group consisting of methyl alcohol, ethyl alcohol, isopropyl alcohol, butyl alcohol, and combinations thereof.

32. A process according to claim 19 wherein said process of preparing said zirconyl phosphate further comprises drying under a drying condition comprising:
  a temperature in the range of from about 20° C. to about 200° C.,
  a pressure in the range of from about 0 pounds per square inch absolute to about 200 pounds per square inch absolute,
  a time period in the range of from about 0.5 hour to about 10 hours, and
  further wherein said drying condition comprises an atmosphere comprising air.

33. A process according to claim 19 wherein said process of preparing said zirconyl phosphate further comprises calcining under a calcining condition comprising:

a temperature in the range of from about 250° C. to about 1000° C., a pressure in the range of from about 0 pounds per square inch absolute to about 750 pounds per square inch absolute, a time period in the range of from about 0.5 hour to about 30 hours, and further wherein said calcining condition comprises an atmosphere comprising air.

34. A process according to claim 23 wherein said process of preparing said zirconyl phosphate further comprises contacting said zirconyl phosphate with a silica component selected from the group consisting of silica, colloidal silica, silica gel, and combinations thereof.

35. A process according to claim 34 wherein said silica component is silica gel.

36. A process according to claim 34 wherein said contacting said zirconyl phosphate with a silica component occurs during said precipitating of said zirconyl phosphate.

37. A process according to claim 34 wherein a weight ratio of said silica component to said zirconyl phosphate is in the range of from about 0.01:1 to about 1:1.

38. A process according to claim 10 wherein a process of preparing said zirconium oxide comprises contacting a zirconyl salt and an ammonia component under a precipitating condition.

39. A process according to claim 38 wherein said precipitating condition comprises:

a temperature in the range of from about 20° C. to about 90° C., a pressure in the range of from about 0 pounds per square inch absolute to about 100 pounds per square inch absolute, and a time period in the range of from about 0.1 hour to about 10 hours.

40. A process according to claim 38 wherein a weight ratio of said zirconyl salt to said ammonia component is in a range of from about 0.5:1 to about 10:1.

41. A process according to claim 38 wherein said zirconyl salt is selected from the group consisting of zirconyl chloride hydrate, zirconyl chloride octahydrate, zirconyl nitrate hydrate, zirconyl nitrate, zirconyl perchlorate octahydrate, and combinations thereof.

42. A process according to claim 38 wherein said zirconyl salt comprises zirconyl nitrate hydrate.

43. A process according to claim 38 wherein said ammonia component is selected from the group consisting of ammonia, ammonium acetate, ammonium bromide, ammonium carbonate, ammonium chloride, ammonium fluoride, ammonium iodide, ammonium nitrate, ammonium sulfate, and combinations thereof.

44. A process according to claim 38 wherein said process of preparing said zirconium oxide further comprises contacting said zirconium oxide with an aqueous solution.

45. A process according to claim 38 wherein said process of preparing said zirconium oxide further comprises contacting with an alcohol selected from the group consisting of methyl alcohol, ethyl alcohol, isopropyl alcohol, butyl alcohol, and combinations thereof.

46. A process according to claim 38 wherein said process of preparing said zirconium oxide further comprises pressure drying under a pressure drying condition comprising:

a temperature in the range of from about 200° C. to about 500° C., a pressure in the range of from about 14.7 pounds per square inch absolute to about 400 pounds per square inch absolute, a time period of from about 0.5 hour to about 10 hours, and further wherein said pressure drying condition comprises an atmosphere selected from the group consisting of nitrogen, argon, and combinations thereof.

47. A process according to claim 38 wherein said process of preparing said zirconium oxide further comprises drying under a drying condition comprising:

a temperature in the range of from about 20° C. to about 200° C., a pressure in the range of from about 0 pounds per square inch absolute to about 200 pounds per square inch absolute, a time period in the range of from about 0.5 hour to about 10 hours, and further wherein said drying condition comprises an atmosphere comprising air.

48. A process according to claim 38 wherein said process of preparing said zirconium oxide further comprises calcining under a calcining condition comprising:

a temperature in the range of from about 250° C. to about 1000° C., a pressure in the range of from about 0 pounds per square inch absolute to about 750 pounds per square inch absolute, a time period in the range of from about 0.5 hour to about 30 hours, and further wherein said calcining condition comprises an atmosphere comprising air.

49. A process according to claim 10 wherein a process of preparing said zirconium phosphate comprises contacting a zirconyl salt and a water-soluble acidic phosphorous compound under a precipitating condition.

50. A process according to claim 49 wherein said water-soluble acidic phosphorous compound is selected from the group consisting of phosphoric acid, phosphorous acid, and combinations thereof.

51. A process according to claim 49 wherein said water-soluble acidic phosphorous compound is phosphoric acid.

52. A process according to claim 49 wherein a weight ratio of said zirconyl salt to said water-soluble acidic phosphorous compound is in a range of from about 0.5:1 to about 10:1.

53. A process according to claim 49 wherein said precipitating condition comprises:

a temperature in the range of from about 20° C. to about 90° C., a pressure in the range of from about 0 pounds per square inch absolute to about 100 pounds per square inch absolute, and a time period in the range of from about 0.1 hour to about 10 hours.

54. A process according to claim 49 wherein said zirconyl salt is selected from the group consisting of zirconyl chloride hydrate, zirconyl chloride octahydrate, zirconyl nitrate hydrate, zirconyl nitrate, zirconyl perchlorate octahydrate, and combinations thereof.

55. A process according to claim 49 wherein said zirconyl salt comprises zirconyl nitrate hydrate.

56. A process according to claim 49 wherein said process of preparing said zirconium phosphate further comprises contacting with an aqueous solution.

57. A process according to claim 49 wherein said process of preparing said zirconium phosphate further comprises contacting with an alcohol selected from the group consisting of methyl alcohol, ethyl alcohol, isopropyl alcohol, butyl alcohol, and combinations thereof.

58. A process according to claim 49 wherein said process of preparing said zirconium phosphate further comprises pressure drying under a pressure drying condition comprising:
- a temperature in the range of from about 200° C. to about 500° C.,
- a pressure in the range of from about 14.7 pounds per square inch absolute to about 400 pounds per square inch absolute,
- a time period in the range of from about 0.5 hour to about 10 hours, and
- further wherein said pressure drying condition comprises an atmosphere selected from the group consisting of nitrogen, argon, and combinations thereof.

59. A process according to claim 49 wherein said process of preparing said zirconium phosphate further comprises drying under a drying condition comprising:
- a temperature in the range of from about 20° C. to about 200° C.,
- a pressure in the range of from about 0 pounds per square inch absolute to about 200 pounds per square inch absolute,
- a time period in the range of from about 0.5 hour to about 10 hours, and
- further wherein said drying condition comprises an atmosphere comprising air.

60. A process according to claim 49 wherein said process of preparing said zirconium phosphate further comprises calcining under a calcining condition comprising:
- a temperature in the range of from about 250° C. to about 1000° C.,
- a pressure in the range of from about 0 pounds per square inch absolute to about 750 pounds per square inch absolute,
- a time period in the range of from about 0.5 hour to about 30 hours, and
- further wherein said calcining condition comprises an atmosphere comprising air.

61. A process of preparing a high molecular weight hydrocarbon comprising contacting, under reaction conditions, a catalyst composition, comprising zirconium and ruthenium, and a fluid comprising hydrogen and carbon monoxide, wherein said zirconium is present in a zirconium component selected from the group consisting of zirconium oxide, zirconium phosphate, zirconyl phosphate, and combinations thereof wherein said contacting is conducted in the presence of a solvent selected from the group consisting of cyclopentane, cyclohexane, cycloheptane, cyclooctane, and combinations thereof.

62. A process according to claim 61 wherein said high molecular weight hydrocarbon comprises a molecular weight greater than about $2 \times 10^3$ molecular weight units.

63. A process according to claim 61 wherein said high molecular weight hydrocarbon comprises polymethylene.

64. A process according to claim 61 wherein a weight ratio of said zirconium to said ruthenium is in the range of from about 0.01:1 to about 5:1.

65. A process according to claim 61 wherein a mole ratio of said hydrogen to said carbon monoxide is in the range of from about 1:1 to about 5:1.

66. A process according to claim 61 wherein said reaction conditions comprise:
- a temperature in the range of from about 100° C. to about 500° C.,
- a pressure in the range of from about 1000 pounds per square inch gauge to about 10,000 pounds per square inch gauge, and
- a charge rate of said fluid such that the weight hourly space velocity is in the range of from about 0.01 hours$^{-1}$ to about 1000 hour$^{-1}$.

67. A process according to claim 61 wherein a weight ratio of said solvent to catalyst composition is in the range of from about 400:1 to about 20:1.

68. A process according to claim 61 wherein said process is conducted in a slurry phase reactor.

* * * * *